United States Patent
Fukuoka et al.

(10) Patent No.: US 6,880,381 B2
(45) Date of Patent: Apr. 19, 2005

(54) KNOCK DETECTION DEVICE

(75) Inventors: Koji Fukuoka, Kobi (JP); Kenji Kasashima, Aichi-ken (JP); Yuji Miyanoo, Seto (JP); Masashi Yoshimi, Toyota (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 10/705,340

(22) Filed: Nov. 10, 2003

(65) Prior Publication Data

US 2004/0103714 A1 Jun. 3, 2004

(30) Foreign Application Priority Data

Dec. 3, 2002 (JP) ........................................ 2002-351506

(51) Int. Cl.[7] .............................................. G01L 23/22
(52) U.S. Cl. ...................................... 73/35.04; 701/111
(58) Field of Search ............................. 73/35.04, 35.06, 73/35.12; 701/111; 123/406.29, 406.37, 406.42

(56) References Cited

U.S. PATENT DOCUMENTS 5,664,544 A * 9/1997 Tomisawa .............. 123/406.42

6,810,320 B1 * 10/2004 Yamamoto et al. ......... 701/111

FOREIGN PATENT DOCUMENTS

JP 2001-32744 2/2001

OTHER PUBLICATIONS

Patent Abstract of Japan, Publication No. 2001032744 A, Published on Feb. 6, 2001, in the name of Sato, et al.

* cited by examiner

Primary Examiner—John E. Chapman
(74) Attorney, Agent, or Firm—Christie, Parker and Hale, LLP

(57) ABSTRACT

A knock detection device that can not only detect knock accurately, but can also detect heavy knock quickly. Cylinder pressure is detected by a pressure sensor installed in each cylinder in an internal combustion engine. AS the occurrence or non-occurrence of heavy knock is determined based on the ratio between the maximum value of cylinder pressure fluctuation and the maximum value of cylinder pressure divided by a prescribed value, it becomes possible to detect the occurrence of heavy knock quickly. If it is determined that heavy knock has occurred, a knock suppression measure involving, for example, reducing the spark advance angle, is immediately applied, thus preventing damage to the internal combustion engine.

10 Claims, 9 Drawing Sheets

HEAVY KNOCK DETECTION PROCESS

CONFORMANCE TEST ROUTINE

HEAVY KNOCK DETECTION PROCESS

USUAL KNOCK DETECTION PROCESS

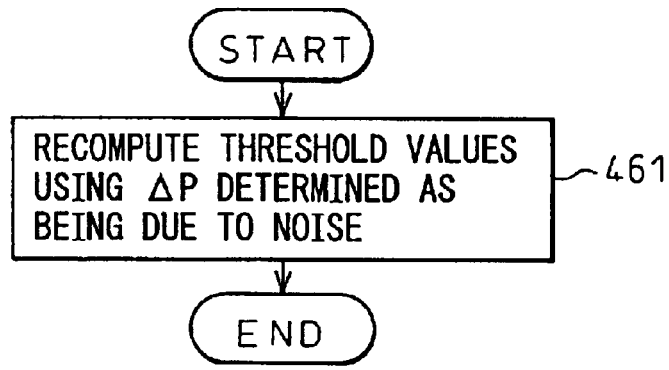
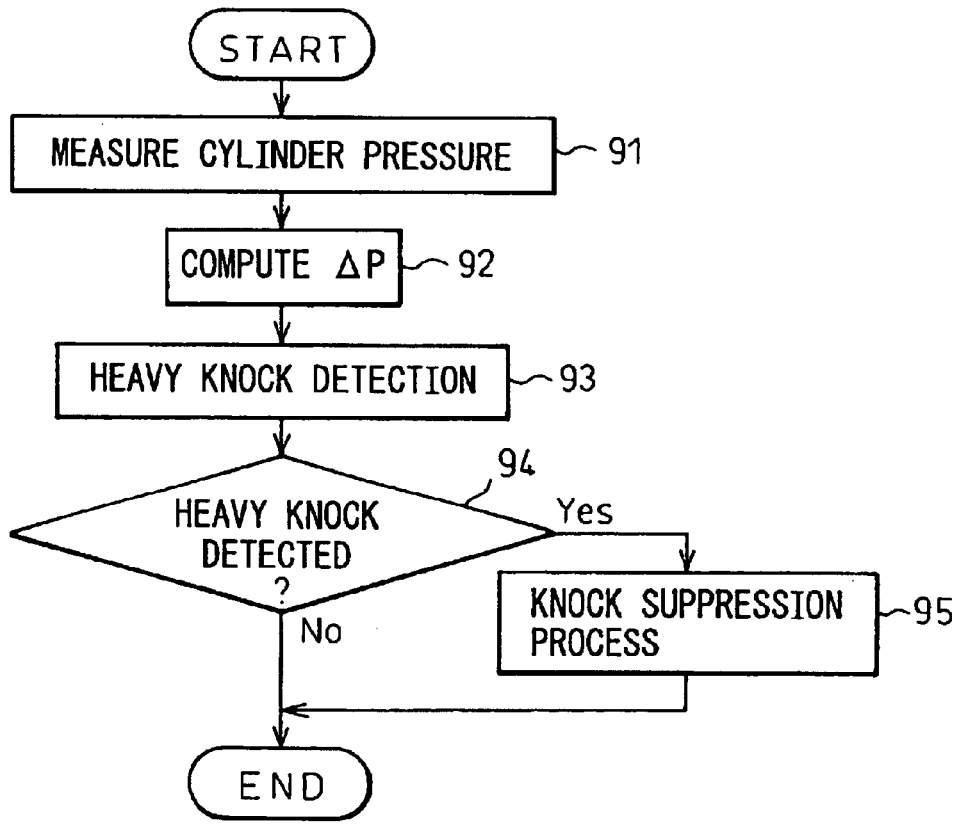

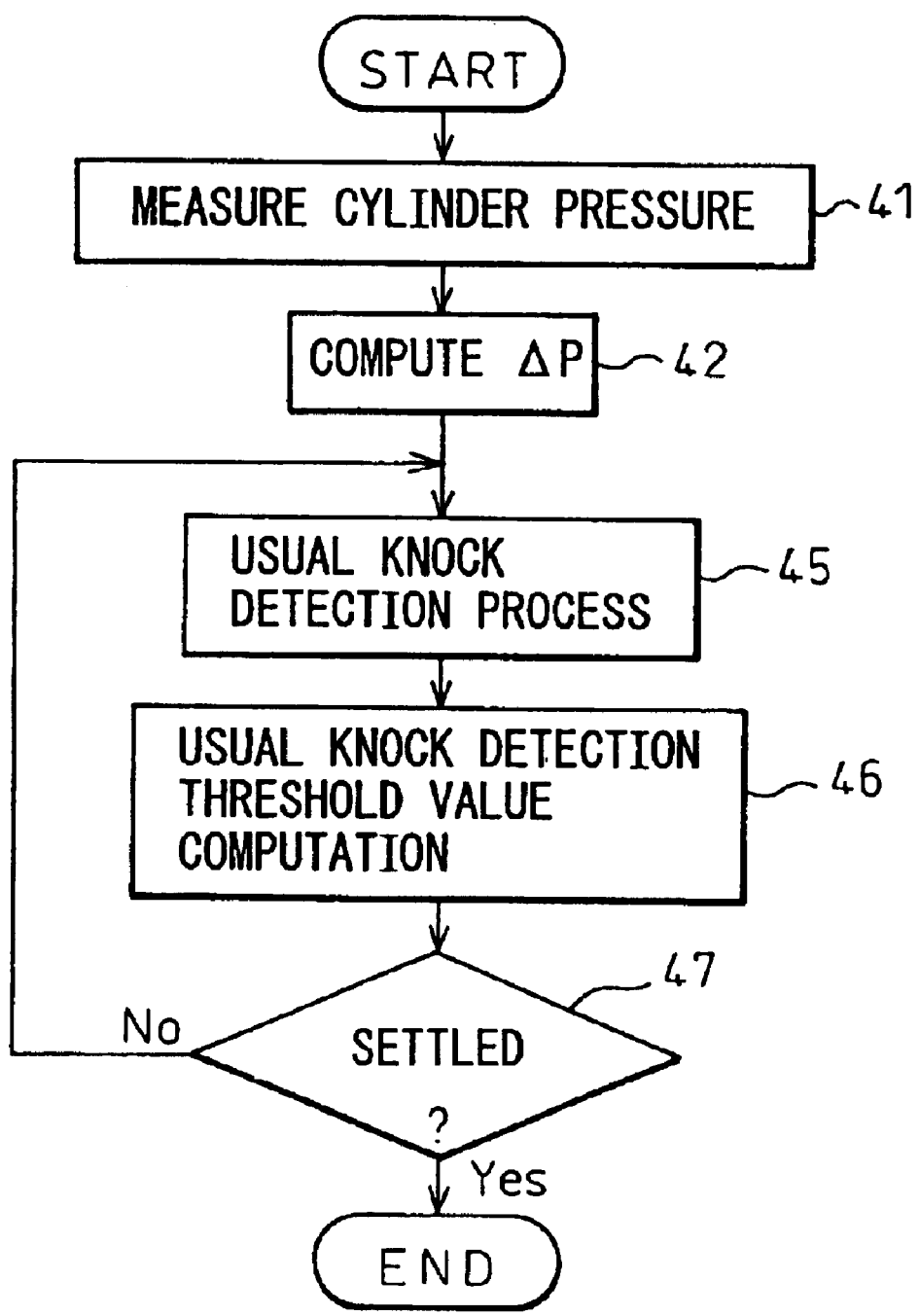

KNOCK DETECTION DEVICE

CROSS-REFERENCE TO RELATED APPLICATION

This application claims priority of Japanese Patent Application Number 2002-351506, filed on Dec. 3, 2002.

BACKGROUND OF THE INVENTION

1. Field of the Invention

The present invention relates to a knock detection device for an internal combustion engine and, more particularly, to a knock detection device capable of rapidly and accurately detecting heavy knock.

2. Description of the Related Art

When applying a newly developed automotive internal combustion engine to an actual automobile, work known as conformance work becomes necessary in order to determine optimum values of parameters (fuel injection amount, ignition timing, valve open/close timing, etc.) to be programmed into an engine control computer, by actually running the internal combustion engine under the various driving conditions that the engine is expected to encounter in actual driving situations.

If all of the conformance work is to be performed manually, many hours (man-hours) will be required; in view of this, the following method is proposed to automate the work for computing the knock detection threshold.

FIG. 1 is a functional diagram of a test setup for implementing the prior art knock detection method. The cylinders in the internal combustion engine 10 are provided with pressure sensors 101 to 104 (in the case of a four-cylinder engine) for measuring the internal pressure of the corresponding cylinder.

The cylinder pressures measured by the pressure sensors 101 to 104 are collected into a high-speed data logger 12 via an amplifier circuit 11. The high-speed data logger 12 also collects data on the crankshaft angle of the internal engine.

The data collected by the data logger 12 is transferred to a cylinder pressure analyzing personal computer 13 which computes the threshold value for knock detection.

Here, to determine an optimum threshold value, the cylinder pressures must be detected, for example, for about 10 seconds (several hundred cycles), and the results must be processed.

There has also been proposed a method that determines, based on cylinder pressure and load information, whether knock has or has not occurred (refer, for example, to Japanese Unexamined Patent Publication No. 2001-32744).

If the magnitude of the knock is large (a heavy knocking condition), a knock suppression measure involving, for example, reducing the spark advance angle, or retarding the intake valve open/close timing, must be applied immediately since such knock can lead to mechanical damage to the internal combustion engine; however, with the prior art knock detection method which takes about 10 seconds to determine the threshold value, if heavy knock occurs before the threshold value is determined, mechanical damage to the internal combustion engine is unavoidable.

SUMMARY OF THE INVENTION

The present invention has been devised in view of the above problem, and an object of the invention is to provide a knock detection device that not only can detect knock accurately and automatically, but also can detect heavy knock quickly.

To achieve the above object, according to a first aspect of the present invention, there is provided a knock detection device comprising: cylinder pressure detecting means for detecting cylinder pressure in an internal combustion engine; threshold value computing means for computing a knock detection threshold value, based on cylinder pressures over a plurality of cycles, detected by the cylinder pressure detecting means; and knock occurrence determining means for determining the occurrence or non-occurrence of knock, based on the threshold value computed by the threshold value computing means, wherein the knock detection device further comprises: maximum cylinder pressure detecting means for detecting a maximum cylinder pressure in each cycle from the cylinder pressures detected by the cylinder pressure detecting means; maximum cylinder pressure fluctuation detecting means for detecting a maximum cylinder pressure fluctuation in each cycle from the cylinder pressures detected by the cylinder pressure detecting means; and heavy knock occurrence determining means for determining the occurrence or non-occurrence of heavy knock in a given cycle, based on the maximum cylinder pressure fluctuation detected by the maximum cylinder pressure fluctuation detecting means and the maximum cylinder pressure detected by the maximum cylinder pressure detecting means.

Preferably, according to a second aspect of the present invention, the heavy knock occurrence determining means determines that heavy knock has occurred in a given cycle when the maximum cylinder pressure fluctuation detected by the maximum cylinder pressure fluctuation detecting means is equal to or larger than an n-th submultiple of the maximum cylinder pressure detected by the maximum cylinder pressure detecting means, where n is a prescribed value larger than 1.

Preferably, according to a third aspect of the present invention, the larger-than-1 prescribed value to be used in the heavy knock occurrence determining means is set as a function of the number of revolutions of the internal combustion engine.

Preferably, according to a fourth aspect of the present invention, there is also included learning means for learning the larger-than-1 prescribed value to be used in the heavy knock occurrence determining means, based on past operating conditions and knocking conditions.

Preferably, according to a fifth aspect of the present invention, the maximum cylinder pressure detecting means detects a difference between a maximum cylinder pressure value and a minimum cylinder pressure value within each cycle as the maximum cylinder pressure.

BRIEF DESCRIPTION OF THE DRAWINGS

Further features and advantages of the present invention will be apparent from the following description with reference to the accompanying drawings, in which:

FIG. 8 is a flowchart illustrating a usual knock threshold value recomputation process;

FIG. 9 is a flowchart illustrating a heavy knock occurrence monitoring routine; and FIG. 10 is a detailed flowchart of a second knock detection process.

DESCRIPTION OF THE PREFERRED EMBODIMENTS

Figure 1:
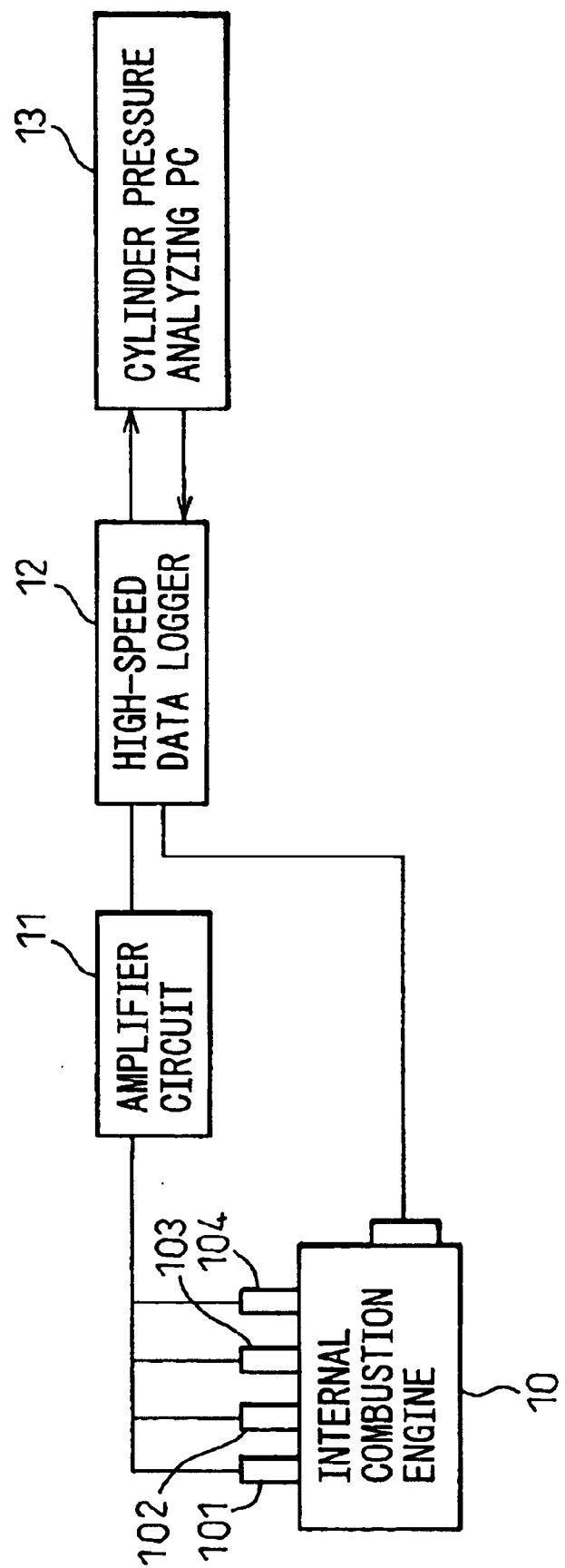
FIG. 1 is a functional diagram of a prior art conformance test setup.
Figure 2:
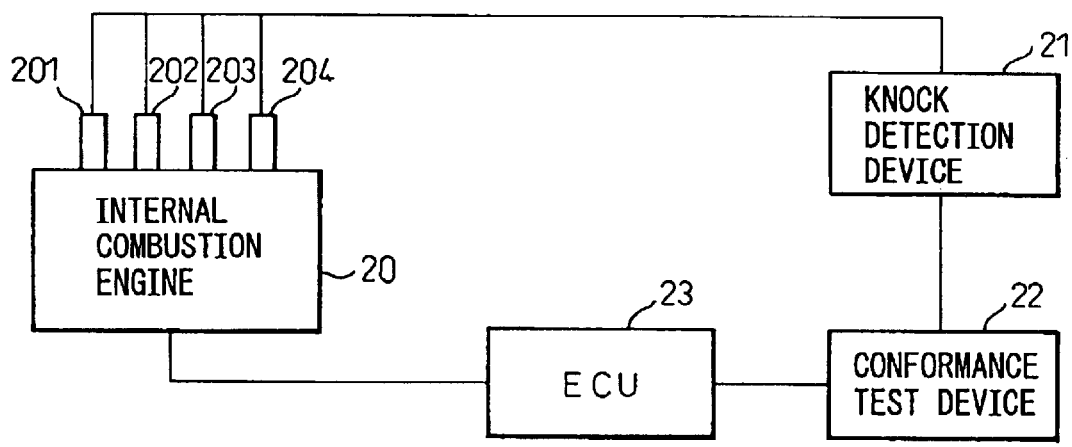
FIG. 2 is a functional diagram of a conformance test setup to which a knock detection device according to the present invention is applied.

FIG. 2 is a functional diagram of a conformance test setup to which a knock detection device according to the present invention is applied. Cylinder pressure sensors 201 to 204 are installed in an internal combustion engine 20, and the outputs of the cylinder pressure sensors 201 to 204 are supplied to the knock detection device 21.

Knock information output from the knock detection device 21 is supplied to a conformance test device 22, and test conditions output from the conformance test device 22 is supplied to an ECU (Electronic Control Unit) 23.

Then, the internal combustion engine 20 is operated in accordance with signals such as ignition timing, valve open/close timing, fuel injection timing, etc. output from the ECU 23.

Figure 3:
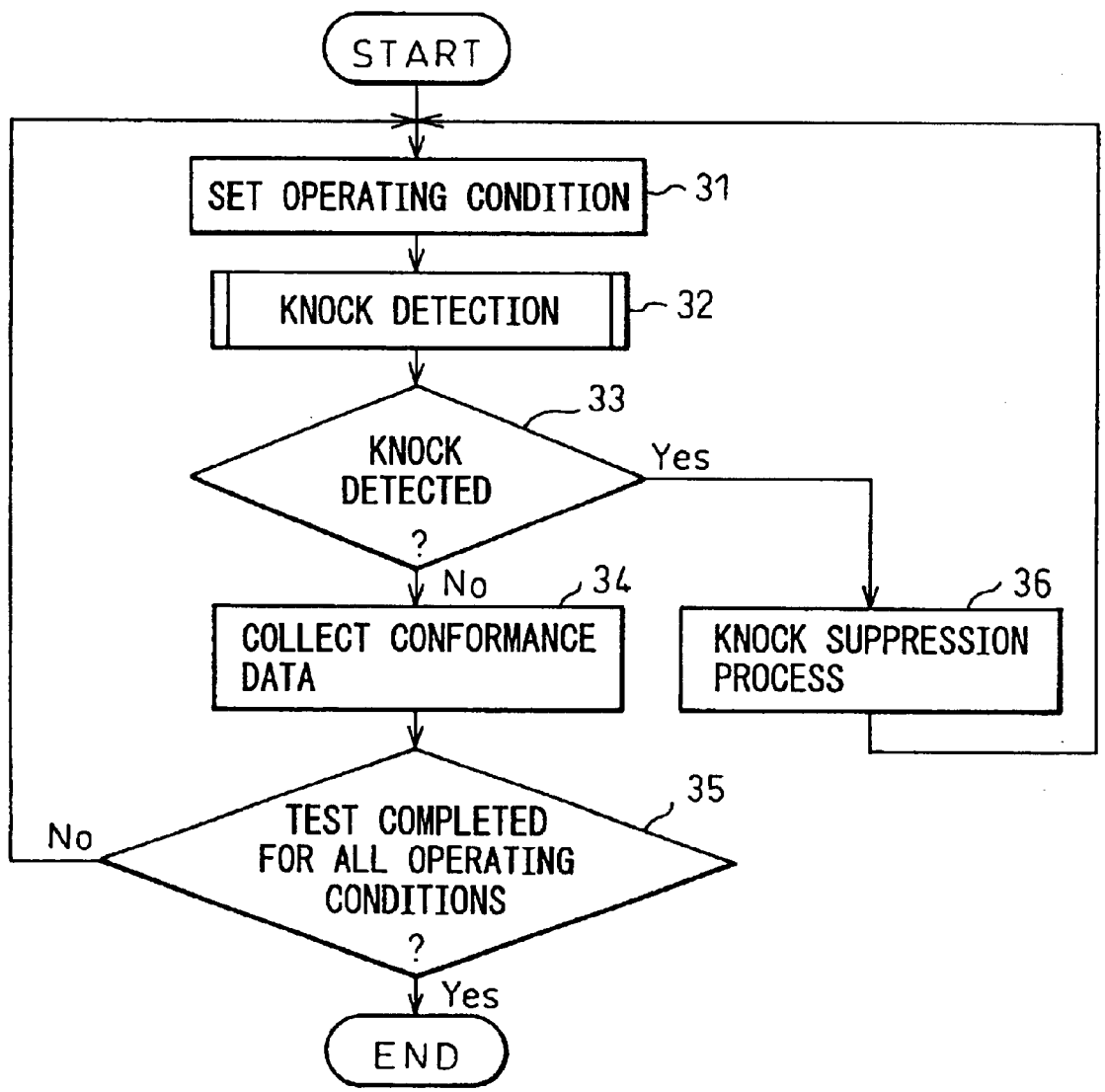
FIG. 3 is a flowchart illustrating a conformance test routine.

FIG. 3 is a flowchart illustrating a conformance test routine. In step 31, a test condition is set, and the operation of the internal combustion engine is started. In step 32, knock detection is performed.

In step 33, whether knock has or has not occurred is determined based on the result of the knock detection; if knock has not occurred, conformance data is collected in step 34.

Then, in step 35, it is determined whether the test has been completed for all operating conditions; if the test is not completed yet, the process returns to step 31.

If it is determined in step 35 that the test has been completed for all operating conditions, the test routine is terminated.

If, in step 33, it is determined that knock has occurred, a knock suppression measure involving, for example, retarding the ignition timing, is applied in step 36, after which the process returns to step 31 and a new operating condition is set.

Figure 4:
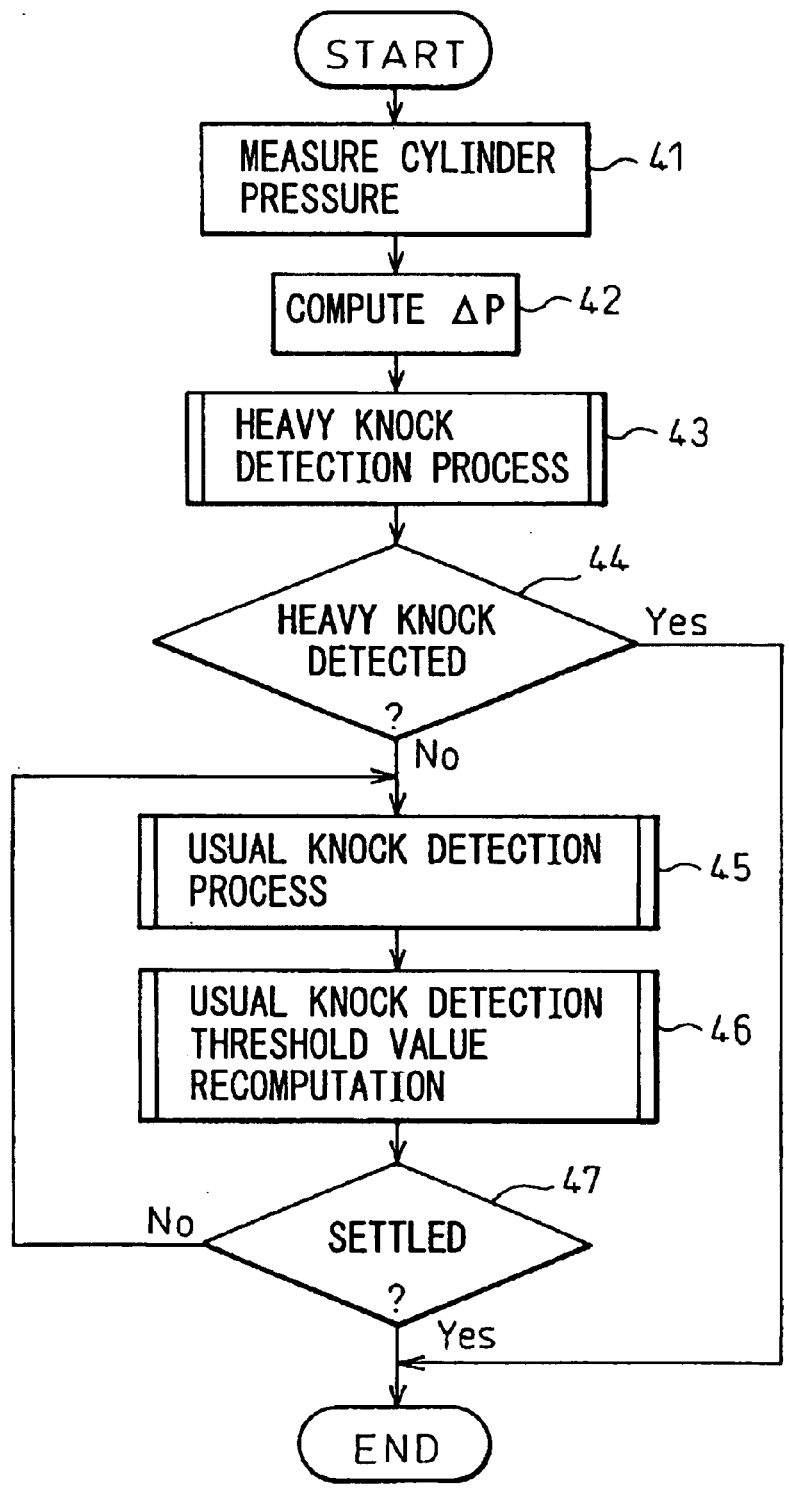
FIG. 4 is a detailed flowchart of a first knock detection process.

FIG. 4 is a detailed flowchart of the knock detection process performed by the knock detection device of the present invention. In step 41, cylinder pressure is measured, and in step 42, cylinder pressure fluctuation $\Delta P$ is computed.

Figure 5A:
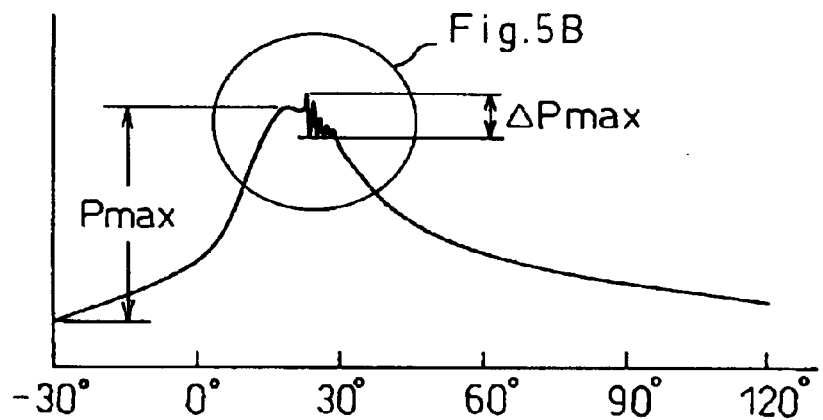
FIGS. 5A, 5B, and 5C are diagrams for explaining a cylinder pressure fluctuation computing method.
Figure 5B:
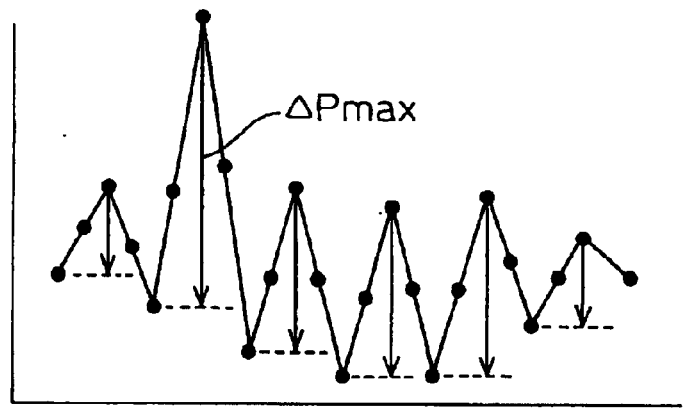
Figure 5C:
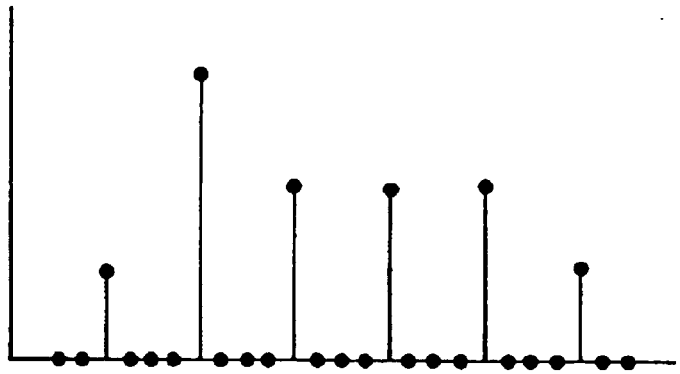

FIGS. 5A, 5B, and 5C are diagrams for explaining the method of computing the cylinder pressure fluctuation; here, FIG. 5A shows how the cylinder pressure fluctuates as the crankshaft angle increases from $-30°$ to $120°$ with top dead center being taken as the reference $(0°)$. The cylinder pressure reaches a maximum Pmax somewhere between $0°$ to $30°$; in the vicinity of the maximum pressure Pmax, the cylinder pressure oscillates at high frequency.

FIG. 5B is an enlarged view of a portion in the vicinity of the peak, solid circles indicating cylinder pressure sampling points. In the present invention, the cylinder pressure fluctuation $\Delta P$ is defined as the difference in cylinder pressure between a minimum value and its immediately succeeding maximum value, and a time series of cylinder pressure fluctuations $\Delta P$ is computed as shown in FIG. 5C.

Next, in step 43, heavy knock detection is performed.

Figure 6:
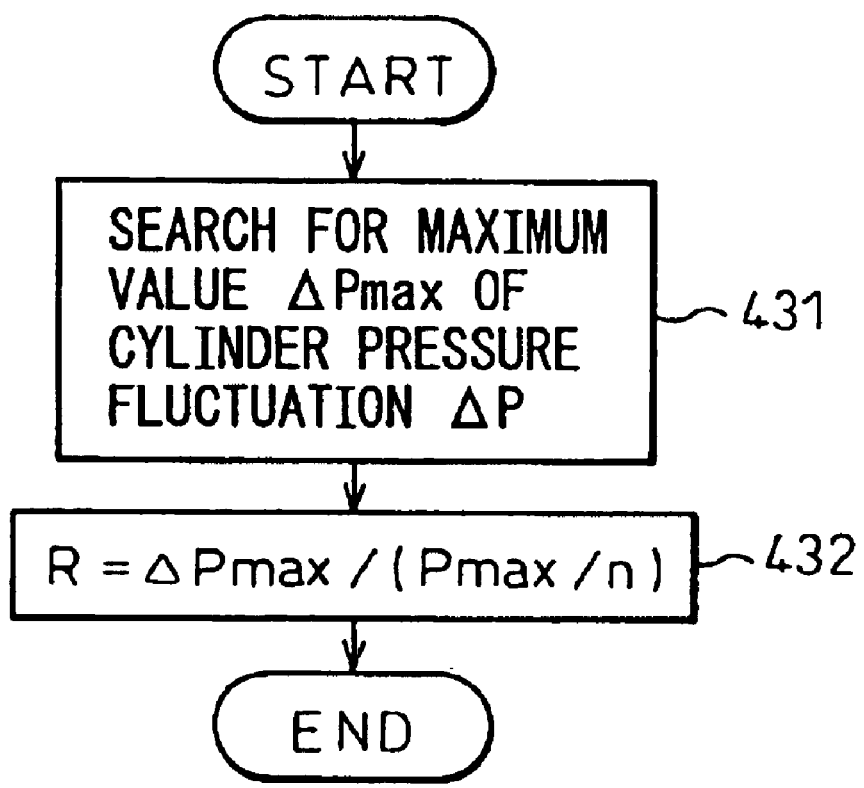
FIG. 6 is a flowchart illustrating a heavy knock detection process.

FIG. 6 is a flowchart illustrating the heavy knock detection process performed in step 43. In step 431, maximum cylinder pressure fluctuation $\Delta Pmax$ is retrieved from the time series of cylinder pressure fluctuations $\Delta P$. Here, the values of the maximum pressure Pmax and the maximum cylinder pressure fluctuation $\Delta Pmax$ are as shown in FIG. 5A.

Next, in step 432, the ratio R between the maximum cylinder pressure fluctuation $\Delta Pmax$ and an n-th submultiple of the maximum pressure Pmax is computed, after which the routine is terminated. Here, n is set as a constant value based on experience but, alternatively, it may be set as a function of the number of revolutions of the internal combustion engine. For example, n can be set to 100 when the number of revolutions is 1000 rpm, and to 3 when the number of revolutions is 6000 rpm.

Provisions may also be made to be able to change the threshold value for heavy knock detection by multiplying the preset value of n by $\alpha$. Furthermore, the value of n may be corrected in accordance with the knocking conditions detected in the previous cycle of the conformance test, and the thus corrected value may be used in the next cycle of the conformance test.

Turning back to the detailed flowchart of the knock detection process in FIG. 4, the occurrence or non-occurrence of heavy knock is determined in step 44 based on the result of the heavy knock detection process. More specifically, if the ratio R between the maximum cylinder pressure fluctuation $\Delta Pmax$ and the n-th submultiple of the maximum pressure Pmax, computed in the heavy knocking detection process, is 1.0 or larger, it is determined that heavy knock has occurred, but if the ratio R is smaller than 1.0, it is determined that heavy knock has not occurred.

If the answer in step 44 is Yes, that is, if it is determined that heavy knock has occurred, the routine is immediately terminated, and the process proceeds to step 33 in the conformance test routine of FIG. 3.

When heavy knock is detected, the answer in step 33 is also Yes, so that the routine immediately proceeds to step 36 to perform the knock suppression process; in this way, the knock can be suppressed before damage is caused to the internal combustion engine 20.

When heavy knock is not detected, the answer in step 44 in the first knock detection process is No, and the process proceeds to step 45 to perform the usual knock detection, after which the usual knock detection threshold value is recomputed in step 46.

Then, in step 47, it is determined whether the threshold value has settled before and after the recomputation; if it has not settled, the process returns to step 45. On the other hand, if it is determined that the threshold value has settled, the routine is terminated.

The process of usual knock detection and the recomputation of the usual knock detection threshold value can be performed using known methods; for example, the following methods may be used.

Figure 7:
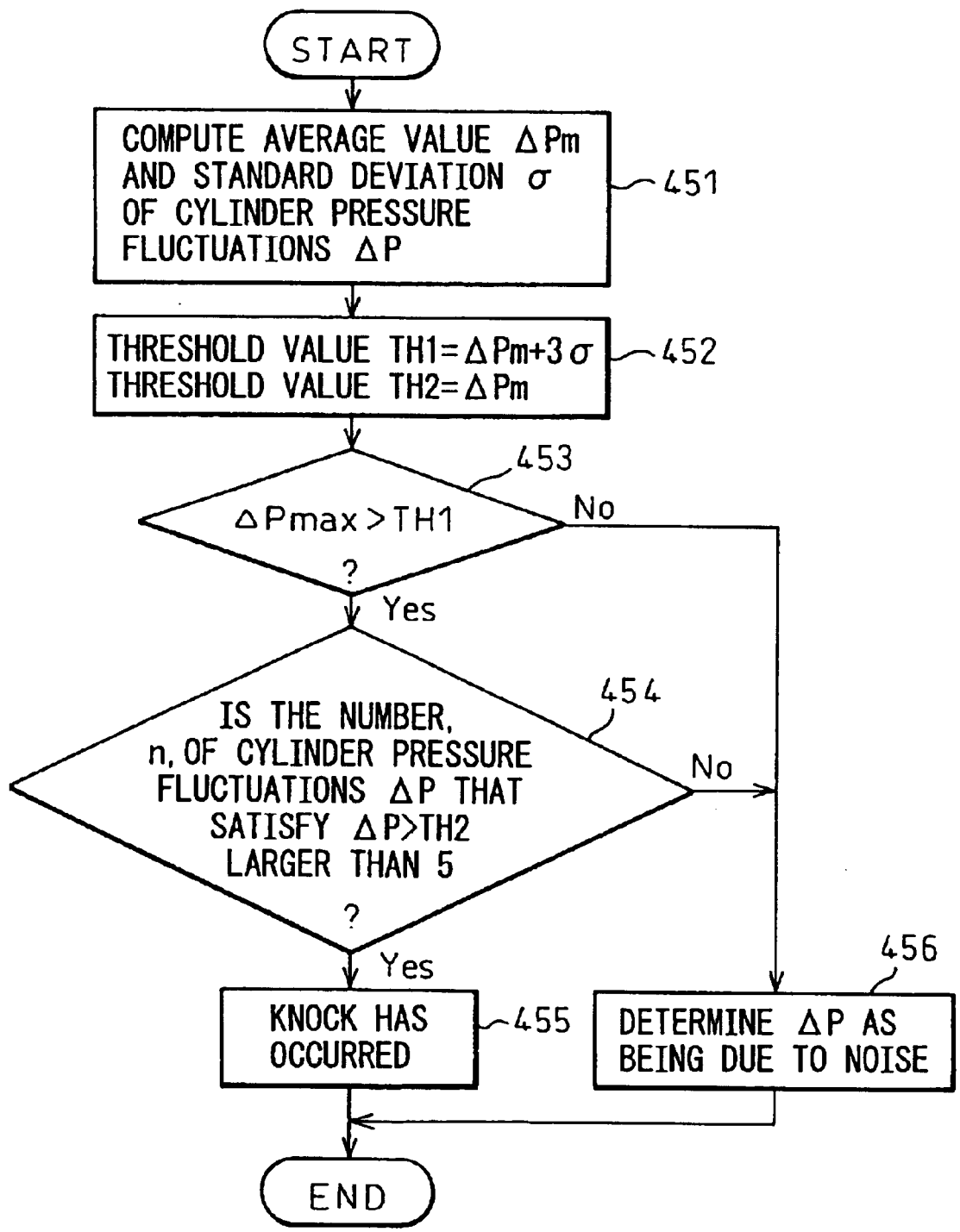
FIG. 7 is a flowchart illustrating a usual knock detection process.

FIG. 7 is a flowchart illustrating the usual knock detection process performed in step 45 in the knock detection processing routine. First, in step 451, the average value $\Delta Pm$ and standard variation $\sigma$ of cylinder pressure fluctuations $\Delta P$ are computed.

Next, in step 452, $\Delta Pm+3\sigma$ is set as a first threshold value TH1, and $\Delta Pm$ is set as a second threshold value TH2.

In step 453, it is determined whether the maximum cylinder pressure fluctuation $\Delta Pmax$ is greater than the first threshold value TH1 and, in step 454, it is determined whether the number, n, of cylinder pressure fluctuations ΔP that are greater than the second threshold value TH2 is larger than a predetermined number, for example, 5.

If the answers in steps 453 and 454 are both Yes, it is determined in step 455 that knock has occurred. On the other hand, if the answer in at least either one of steps 453 and 454 is No, then it is determined in step 456 that the cylinder pressure fluctuation ΔP is due to noise.

FIG. 8 is a flowchart illustrating the usual knock detection threshold value recomputation process performed in step 46 in the knock detection processing routine. In step 461, the first and second threshold values TH1 and TH2 are recomputed using the cylinder pressure fluctuation determined as being due to noise.

Then, in the knock detection process, if the first and second threshold values TH1 and TH2 substantially agree with the recomputed values, it is determined that the process has settled, and the knock detection process is terminated.

Turning back to the conformance test routine of FIG. 3, it is determined in step 33 whether knock has or has not occurred; if the answer is Yes, the routine proceeds to step 36 to perform the knock suppression process, after which the routine returns to step 31.

If the answer in step 33 is No, the routine proceeds to step 34 where the operating state of the internal combustion engine is collected as conformance data. Next, it is determined in step 35 whether the test has been completed for all operating conditions; if the test is not completed yet, the process returns to step 31, to continue the conformance test by changing the test condition.

The present invention requires that the cylinder pressure be detected at predetermined intervals of time or at predetermined rotation angle but, as the detection cycle is shortened, the load of the conformance test device increases; accordingly, the optimum detection cycle must be determined that matches the capability of the conformance test device.

Further, in the case of a four-stroke internal combustion engine, it is desirable to detect cylinder pressure over the entire crankshaft angle range of 0° to 720°, but the cylinder pressure may be detected over a predetermined range, for example, ±180°, centered about top dead center in order to reduce the load of the conformance test device; to further reduce the load, the cylinder pressure may be detected over a range of, for example, top dead center to 90°, where the maximum cylinder pressure Pmax and the maximum cylinder pressure fluctuation ΔPmax can be computed.

Here, the maximum cylinder pressure Pmax is computed as the difference between the maximum and minimum values of the detected cylinder pressures.

Further, in heavy knocking conditions, as the cylinder pressure fluctuation increases, it is desirable to compute the maximum cylinder pressure Pmax based on a signal obtained by filtering the output of the pressure sensor by a low-pass filter; this ensures accurate computation of the maximum cylinder pressure Pmax.

Furthermore, when a peak hold circuit is inserted after the pressure sensor, the maximum and minimum values of the detected cylinder pressures can be detected by hardware means, which helps to reduce the load of the conformance test device.

Depending on operating conditions, there are cases where heavy knock cannot occur; in such cases, monitoring for the occurrence of heavy knock may be omitted.

In the above embodiment, monitoring for the occurrence of heavy knock is not performed when the routine is executing the usual knock detection process, the usual knock detection threshold value recomputation process, or the conformance data collection process.

In a second embodiment in which the heavy knock occurrence monitoring is performed constantly throughout the conformance test, the heavy knock occurrence monitoring routine must be made independent of the conformance test routine.

FIG. 9 is a flowchart illustrating the heavy knock occurrence monitoring routine which is performed in parallel with the conformance test routine in accordance with the second embodiment. First, in step 91, cylinder pressure is measured.

Then, in step 92, cylinder pressure fluctuation ΔP is computed, and in step 93, heavy knock detection is performed, the details of which are the same as previously described.

If it is determined in step 94 that heavy knock has occurred, the knock suppression process is performed in step 95, after which the routine is terminated.

On the other hand, if it is determined in step 94 that heavy knock has not occurred, the routine is immediately terminated.

FIG. 10 is a detailed flowchart of a second knock detection process to be applied in the second embodiment; the process is the same as the first knock detection process except that steps 43 and 44 are omitted.

According to the knock detection device of the present invention, heavy knock can be detected accurately and quickly without adding any new sensors but by using the cylinder pressure sensors used in the prior art knock detection method. Accordingly, not only can the conformance work be done in a short time, but damage to the internal combustion engine for which the conformance work is being done can be avoided. It is apparent that the present invention is also applicable to the detection of heavy knock that may occur during usual driving.

According to the knock detection device of the present invention, since the occurrence or non-occurrence of heavy knock can be determined accurately and quickly based on the maximum cylinder pressure and the maximum value of the high-frequency cylinder pressure fluctuation in each cycle detected using the cylinder pressure sensors used in the prior art knock detection method, a knock suppression measure can be applied immediately upon the occurrence of heavy knock, thus preventing damage to the internal combustion engine.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A knock detection device comprising: cylinder pressure detecting means for detecting cylinder pressure in an internal combustion engine; threshold value computing means for computing a knock detection threshold value based on cylinder pressures for a plurality of cycles detected by said cylinder pressure detecting means; and knock occurrence determining means for determining the occurrence or non-occurrence of knock, based on said threshold value computed by said threshold value computing means, wherein said knock detection device further comprises:

maximum cylinder pressure detecting means for detecting a maximum cylinder pressure in each cycle from said cylinder pressures detected by said cylinder pressure detecting means;

maximum cylinder pressure fluctuation detecting means for detecting a maximum cylinder pressure fluctuation in each cycle from said cylinder pressures detected by said cylinder pressure detecting means; and heavy knock occurrence determining means for determining the occurrence or non-occurrence of heavy knock in a given cycle, based on said maximum cylinder pressure fluctuation detected by said maximum cylinder pressure fluctuation detecting means and said maximum cylinder pressure detected by said maximum cylinder pressure detecting means.

2. A knock detection device as claimed in claim 1, wherein said heavy knock occurrence determining means determines that heavy knock has occurred in said given cycle when said maximum cylinder pressure fluctuation detected by said maximum cylinder pressure fluctuation detecting means is equal to or larger than an n-th submultiple of said maximum cylinder pressure detected by said maximum cylinder pressure detecting means, where n is a prescribed value larger than 1.

3. A knock detection device as claimed in claim 2, wherein said larger-than-1 prescribed value to be used in said heavy knock occurrence determining means is set as a function of the number of revolutions of said internal combustion engine.

4. A knock detection device as claimed in claim 2, further comprising learning means for learning said larger-than-1 prescribed value to be used in said heavy knock occurrence determining means, based on past operating conditions and knocking conditions.

5. A knock detection device as claimed in any one of claims 1 to 4, wherein said maximum cylinder pressure detecting means detects a difference between a maximum cylinder pressure value and a minimum cylinder pressure value within each cycle as said maximum cylinder pressure.

6. A knock detection device comprising: a cylinder pressure sensor for detecting cylinder pressure in an internal combustion engine; a threshold value computing unit for computing a knock detection threshold value based on cylinder pressures for a plurality of cycles detected by said cylinder pressure sensor; and a knock occurrence determining unit for determining the occurrence or non-occurrence of knock, based on said threshold value computed by said threshold value computing unit, wherein said knock detection device further comprises:

a maximum cylinder pressure detecting unit for detecting a maximum cylinder pressure in each cycle from said cylinder pressures detected by said cylinder pressure sensor;

a maximum cylinder pressure fluctuation detecting unit for detecting a maximum cylinder pressure fluctuation in each cycle from said cylinder pressures detected by said cylinder pressure sensor; and a heavy knock occurrence determining unit for determining the occurrence or non-occurrence of heavy knock in a given cycle, based on said maximum cylinder pressure fluctuation detected by said maximum cylinder pressure fluctuation detected unit and said maximum cylinder pressure detected by said maximum cylinder pressure detecting unit.

7. A knock detection device as claimed in claim 6, wherein said heavy knock occurrence determining unit determines that heavy knock has occurred in said given cycle when said maximum cylinder pressure fluctuation detected by said maximum cylinder pressure fluctuation detecting unit is equal to or large than an n-th submultiple of said maximum cylinder pressure detected by said maximum cylinder pressure detecting unit, where n is a prescribed value larger than 1.

8. A knock detection device as claimed in claim 7, wherein said larger-than-1 prescribed value to be used in said heavy knock occurrence determining unit is set as a function of the number of revolutions of said internal combustion engine.

9. A knock detection device as claimed in claim 7, further comprising a learning unit for learning said larger-than-1 prescribed value to be used in said heavy knock occurrence determining unit, based on past operating conditions and knocking conditions.

10. A knock detection device as claimed in any one of claims 6 to 9, wherein said maximum cylinder pressure detecting unit detects a difference between a maximum cylinder pressure value and a minimum cylinder pressure value within each cycle as said maximum cylinder pressure.

* * * * *

UNITED STATES PATENT AND TRADEMARK OFFICE
CERTIFICATE OF CORRECTION

PATENT NO. : 6,880,381 B2
DATED : April 19, 2005
INVENTOR(S) : Fukuoka et al.

It is certified that error appears in the above-identified patent and that said Letters Patent is hereby corrected as shown below:

Title page,
Item [75], Inventors, "Koji Fukuoka" delete "Kobi", insert -- Kobe --.
Item [57], ABSTRACT,
Line 4, delete "AS", insert -- As --.

Column 8,
Line 18, delete "detected unit", insert -- detecting unit --.
Line 26, delete "or large than", insert -- or larger than --.

Signed and Sealed this

Twenty-fourth Day of January, 2006

JON W. DUDAS
*Director of the United States Patent and Trademark Office*